April 6, 1965          B. TAYLOR          3,176,795
ELEVATED WORKING SUPPORT
Filed Nov. 8, 1963
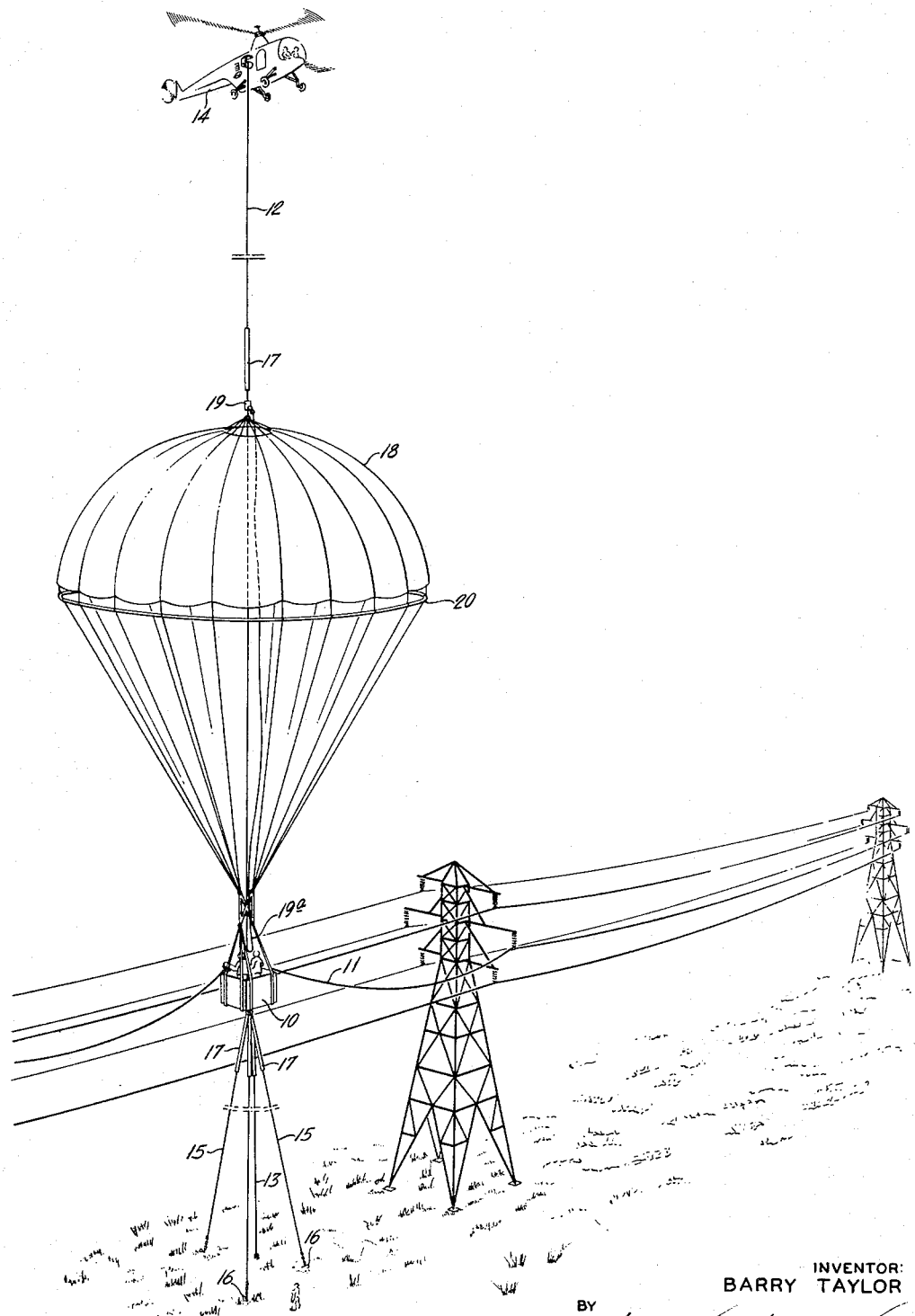
INVENTOR:
BARRY TAYLOR 3,176,795
ELEVATED WORKING SUPPORT
Barry Taylor, P.O. Box 8, Franklin, Pa.
Filed Nov. 8, 1963, Ser. No. 322,402
4 Claims. (Cl. 182—82)

This invention relates to an elevated working support and has for an object the provision of improvements in this art. The invention is particularly intended to provide a high level support for workmen engaged in the installation or repair of high tension lines in otherwise inaccessible terrain but is adapted for work on high buildings, towers, trees and other places where applicable.

For working on power lines at moderately low levels, trucks with elevating working supports are coming into wide use. For some types of installations it is convenient for workmen to climb poles or towers. Whenever possible, the current is cut off from the line during working operations. When this is inconvenient or impossible, the workmen wear insulating gloves or work with bare hands or an insulating hot stick, depending on the voltage and insulation conditions.

There are many situations, however, which are so unusual that none of the normal equipment and procedure provide a very good solution. Where the towers are very high and the terrain very rugged, as over canyons, rivers, cliffs and the like, it is difficult for workmen to gain access to a working position. Indeed, it is often difficult or almost impossible to travel to the working site; but helicopters are now aiding more frequently in bringing men and equipment to difficult working locations. This still does not serve to support workmen in a safe and advantageous position while working at high levels.

According to the present invention, there is provided a high level working support which is fully insulated and stable even when working on hot high tension lines with bare hands. The support is quickly installed; safe in case of failure of the primary suspending means; can be used in practically any terrain, no matter how rough; and is relatively simple in character.

The invention provides a working support in the form of a cage or bar-framed platform which is held in position by overhead suspending means acting against an earth-connected anchor line. The suspending means may be a lighter-than-air craft, such as a balloon, but preferably is a helicopter which can also be used in setting up the installation and in transporting men and equipment to the site. Guy lines to the cage are provided for holding the cage in a steady fixed position regardless of lateral shifting of the supporting means with variable winds or air currents.

Dependable insulating links are provided both above and below the cage to assure a safe working support for any line voltage or any kind of weather.

Below the suspending or lifting support means and above the cage there is provided a safety support in the form of a fully open parachute of adequate size to lower the cage slowly in case of primary support failure to prevent injury to the workmen.

There is also provided above the safety support a quick-release connection in the supporting line which can be operated from either the cage or from the overhead suspending means in case of emergency.

The objects of the invention, as well as various novel features and advantages, will be apparent from the following description of an illustrative embodiment of the invention, reference being made to the accompanying drawings, in which the single figure is a schematic elevation of an exemplary installation embodying the invention.

Referring to the drawings, a working support in the form of a platform cage 10 is held in position for workmen therein to work on a high-level high-tension cable 11, say to make a repair splice therein. The cage is supported from above by a lift line 12 and is attached to the earth by one or more anchor lines 13.

The primary suspending means 14 shown herein is a helicopter and the lift line 12 attached thereto is preferably quite long to avoid disturbing down draft from the propeller and to minimize the effect of shifts in position of the helicopter on the position of the cage.

To hold the cage more securely in a stable position, guy lines 15 are connected between the cage and fixed anchorages on the ground.

The anchor line 13 and the guy lines 15 are attached to suitable anchor elements 16 on the ground, such as trees, rocks, buried members, or the like as may be handy at the particular location.

The lines 12, 14 and 15 are preferably strong non-metallic strands, such as "Nylon," "Dacron" or the like; and for certain insulation in case of rain, lightning, and the like, each line is provided with an insulating link or hot stick 17 of known type such as epoxyglas. Preferably the lines below and adjacent the cage are made of a material having relatively little stretch, such as "Dacron"; and the line to the helicopter is made of a material with relatively more stretch, such as "Nylon" to absorb the vertical surges of the suspending means.

In the cage, each line connection preferably includes a positive drive winding device or windlass to provide correct tension and some shiftability to control the position of the cage. Of course, the helicopter may, as usual, have power elevating mechanism for operating the lift line 12. It will also preferably have the usual additional service elevating lines for lifting the men, equipment and supplies to and from the cage.

A secondary suspending means 18 for the cage, in the form of an open parachute, is provided in case the primary suspending means should fail. A quick release link 19 is provided between the helicopter and the parachute, this being operable remotely from the cage as by a pull line 19a. The parachute is held in open position by any suitable means, such as a light stiffening ring 20 of metal, an inflated annulus, or the like. The parachute is preferably placed at a considerable distance above the cage so it will not foul on the power line, trees or other obstruction before the cage reaches the ground. This distance will vary with the terrain. The working site may in some cases be above a deep ravine or river, in which case appropriate lengths of all lines will be arranged.

When conditions permit, the cage may be secured to a lateral anchorage, such as the lines or a tower, suitable insulation being provided in the connection. This will provide greater steadiness while working.

Local communication means will usually be provided between the helicopter crew and the working crew, preferably of a type such as radio ("walkie-talkie") without interconnecting wires.

In making a set-up, the helicopter may bring all personnel and equipment to the site. Men with the necessary equipment will be lowered to the ground to establish the necessary earth connections of the anchor lines 13. The cage is connected with the estimated length of anchor line. The lift line 12 and parachute are attached to the top of the cage and the cage pulled up by the helicopter. The parachute is preferably held closed by a suitable pull release line at this time. The guy lines will also be anchored to the earth and also attached to the cage if there is no obstruction to foul them on the way up. If there is an obstruction they may later be thrown out of the cage in a manner to clear obstructions and fastened by a man on the ground.

The man or men may be pulled up with the car but if this is dangerous they may be pulled up later by a separate lift from the helicopter.

When the men are in the cage they can quickly adjust the lines to desired length by the winding means provided for each. The parachute will be opened if it was not raised in open position. Pulling a release cord to allow the peripheral band to open it or supplying gas to inflate the peripheral annulus, are two convenient ways to spread the parachute.

It will be seen that the installation can be transported to practically any site and set up for use in a short period of time. All of the equipment is relatively simple and inexpensive except the helicopter; and considering the great advantages of speed, access to difficult sites and situations, and the great operating investments served by high tension power lines, even the helicopter is economical. If desired, the helicopter may be freed for other service by substituting a lighter-than-air craft after the equipment has been set up, the helicopter returning later to lower it.

While one embodiment of the invention has been described for purposes of illustration, it is to be understood that there may be various embodiments and modifications within the general scope of the invention.

I claim:

1. An elevated working support for high level high tension electric lines comprising in combination, a working support platform, a helicopter for suspending said working support platform, an open parachute intermediate said working support platform and said helicopter, means connecting said open parachute to said working support platform to support said platform from said parachute, a lifting line interconnecting the top of said parachute and said helicopter to hold the parachute and working support platform in an elevated position, a quick release connection in said lifting line between said parachute and said helicopter operable from said work support platform to release the connection between said helicopter and said parachute, and at least one anchor line secured to said working support platform and to the earth to hold said platform in a relatively fixed elevated position, said anchor line being made of a material having relatively little elongation with tension loading and said lifting line being made of a material having relatively greater elongation with tension loading.

2. An elevated working support as set forth in claim 1 in which a plurality of anchor lines are provided secured to said working support platform and diverging outwardly from one another from said working support platform to anchor points on the earth beneath said platform.

3. Apparatus as set forth in claim 1, which further includes insulating links in all of said lines.

4. Apparatus as set forth in claim 1, which further includes lateral steadying guy lines connected between said platform and earth anchorages.

References Cited by the Examiner
UNITED STATES PATENTS

| | | | |
|---|---|---|---|
| 380,254 | 3/88 | Fisher | 182—112 |
| 409,511 | 8/89 | Slough | 182—112 |
| 2,264,919 | 12/41 | Strong | 272—2 |
| 3,017,138 | 1/62 | Flint | 244—3 |

HARRISON R. MOSELEY, *Primary Examiner.*

REINALDO P. MACHADO, *Examiner.*